(12) United States Patent
Groppo

(10) Patent No.: US 8,888,430 B2
(45) Date of Patent: Nov. 18, 2014

(54) ANTITHEFT LOCKING DEVICE

(71) Applicant: Lazzaro Groppo, Cuneo (IT)

(72) Inventor: Lazzaro Groppo, Cuneo (IT)

( * ) Notice: Subject to any disclaimer, the term of this patent is extended or adjusted under 35 U.S.C. 154(b) by 117 days.

(21) Appl. No.: 13/649,222

(22) Filed: Oct. 11, 2012

(65) Prior Publication Data

US 2014/0105704 A1    Apr. 17, 2014

(51) Int. Cl.
*F16B 23/00*    (2006.01)

(52) U.S. Cl.
USPC .............................. 411/403; 70/231

(58) Field of Classification Search
USPC ......... 70/229, 231, 232; 411/403, 349, 372.6, 411/373
See application file for complete search history.

(56) References Cited

U.S. PATENT DOCUMENTS

| | | | | |
|---|---|---|---|---|
| 1,900,146 A | * | 3/1933 | Winkler | 70/232 |
| 3,241,408 A | | 3/1966 | McCauley | |
| 4,057,985 A | * | 11/1977 | Stahl | 70/231 |
| 4,362,035 A | * | 12/1982 | Vitale | 70/165 |
| 4,690,167 A | * | 9/1987 | Skipper | 137/382 |
| 4,726,723 A | * | 2/1988 | Bainbridge | 411/432 |
| 5,730,567 A | * | 3/1998 | Haseley et al. | 411/403 |
| 7,445,414 B1 | * | 11/2008 | Notaro et al. | 411/432 |

FOREIGN PATENT DOCUMENTS

IT    1279160 A1    9/1996

\* cited by examiner

*Primary Examiner* — Gary Estremsky
(74) *Attorney, Agent, or Firm* — Paul & Paul

(57) ABSTRACT

An antitheft locking device (11), in particular for fixing a wheel to a motor vehicle hub, made in form of a nut or bolt, comprising a body (13) provided with engagement means (21) for a complementary key by means of which it is possible to rotate said device, and an associated bushing (19) freely rotatable around said body (13), in which at least a radial seat (25) is provided for at least a retaining element (23) capable of preventing the axial withdrawal of the bushing (19) from the body (13), said seat being obtained partially in the body (13) of the device and partially in the bushing (19), wherein said seat (25) has a depth varying along the axial direction.

8 Claims, 7 Drawing Sheets

ANTITHEFT LOCKING DEVICE

TECHNICAL FIELD

The present invention refers to an antitheft locking device.

More particularly, the invention refers to an antitheft locking device, in form of a nut or bolt, for fixing a wheel to a motor vehicle hub.

PRIOR ART

Antitheft locking devices are known, made in form of a threaded nut or bolt and provided with a neutral rotatable bushing, which prevents the rotation thereof with normal tools, such as fixed or adjustable keys. Therefore, for screwing or unscrewing said nuts or bolts, a special antitheft key must be used, which engages the head of the nut or bolt and which has a suitable shape to be rotated with a traditional tool, such as precisely a fixed or adjustable key.

IT 1.279.160 ed U.S. Pat. No. 3,241,408 show corresponding examples of antitheft devices of the aforesaid type.

According to the prior art, the coupling between the complementary antitheft key and the head of the nut or bolt takes place through the engagement of a shaped projection, provided on the head of the key, with a corresponding complementary seat, provided in the head of the antitheft nut or bolt. As an alternative, the projection can be provided in the head of the nut or bolt and the complementary seat can be obtained on the key.

Always according to the prior art, the seat can assume, for example, the form of a continue or interrupted groove, shaped in different ways, or of a plurality of holes arranged in different ways.

Even according to the prior art, for preventing that the nut or bolt can be rotated without using the complementary antitheft key, a bushing fitted on the head of the nut or bolt is provided, which can rotate neutral with respect to said head. For retaining the bushing on the body of the antitheft device, a steel elastic ring, of the "seeger" type, is generally provided, which is housed in a corresponding circumferential seat provided on the head of the antitheft device. An example of this arrangement is shown in IT 1.279.160.

Thanks to the presence of the bushing that is mounted neutral, i.e. free to rotate around the body of the nut or bolt, it is impossible to grasp and to unscrew the nut or bolt from outside with a traditional tool, such as for instance a pincer or the like.

If it were possible to rotate the head of the nut or bolt without using the complementary key, the antitheft function would be nullified. Therefore, in the past antitheft devices of the aforesaid type have been developed, able to resist to the common burglary efforts.

In the known devices, the more common burglary efforts provide to forcibly remove the bushing from the body of the device. This result can be obtained, for example, by inserting the point of a chisel or screwdriver or similar tool at the bushing base and by bashing the chisel with a hammer or the like while simultaneously levering for withdrawing the bushing from the rest of the device. In these circumstances, the elastic ring retaining the bushing against the body of the antitheft device could not be able to resist to the applied strength and, slipping out from its seat, would leave the bushing free to axially exit from the device, thus uncovering the side surface thereof. The device without neutral rotatable bushing would be then easily rotated, since it could be grasped on one side with a pincer or the like.

As it results from the daily experience, the known devices do not completely eliminate this possibility of burglary.

In general, the withdrawal or breaking of the ring retaining the bushing is made possible by the fact that it is housed with a certain radial clearance inside a circumferential groove partially obtained in the body of the device and partially in the bushing. The radial clearance is required by the need of mounting the bushing on the body of the device. Upon lack of said clearance, in fact, the assembly of the bushing on the device would not be possible without causing breakings or permanent deformations in the materials.

At present, therefore, the need exists of having available antitheft devices of the aforesaid type, capable of resisting to more and more severe burglary efforts, which can cause in particular the withdrawal of the bushing from its seat.

A first object of the invention is, therefore, to provide an antitheft locking device, in particular for fixing a wheel of a motor vehicle, capable of resisting to these particularly severe burglary efforts directed to the forced removal of the neutral bushing.

Another object of the invention is to provide an antitheft device of the aforesaid type, which can be made in form of either a bolt or a nut.

One of the drawbacks that one meets when making antitheft devices of the aforesaid type, which incorporate a neutral bushing retained by an elastic ring, comes from the difficulty of mounting the bushing, since the ring has to be particularly resistant and the clearances have to be limited, for preventing the removal of the bushing once it is fitted on the head of the device. In this mounting step, moreover, cases in which the bushing, the ring or the head of the device are damaged by a too vigorous action are not rare.

A further object of the invention is, therefore, to provide an antitheft device of the aforesaid type, which can be made more easily and with costs reduced with respect to the prior art devices and in which the risk of damaging the surface of the bushing or of other parts of the device during the assembly steps is highly reduced.

A non-last object of the invention is to provide an antitheft device of the aforesaid type, which can be made with simple and cheap adjustments of the present production plants and processes.

DESCRIPTION OF THE INVENTION

These and other objects are achieved by the antitheft locking device as claimed in the appended claims.

Advantageously, according to the invention, the removal of the bushing is particularly difficult, thanks to the presence of a groove having variable depth, within which the retaining ring is housed.

A further advantage of the invention results from the fact that the depth of such groove can be realised in a way such as to define a seat within which the retaining element is housed substantially without clearances in the radial direction.

A non-last advantage of the invention resides in that it is suitable for being industrially provided on a device made in form of either a nut or a bolt.

BRIEF DESCRIPTION OF THE FIGURES

Some embodiments of the invention will be described by way of non-limiting example, with reference to the appended drawings in which elements denoted by the same numeral reference are components having the same or similar functionality and construction and in which.

DESCRIPTION OF SOME PREFERRED EMBODIMENTS

With reference to the appended figures, an antitheft locking device 11 according to a preferred embodiment of the invention is shown.

The device 11 comprises a body 13 capable of being associated, preferably screwed, to the hub of a motor vehicle, for fixing the rim of a wheel.

Said body 13 preferably has a cylindrical shape and it is provided with a frusto-conical base, intended for abutting against a surface to be blocked, for example of a rim of a motor vehicle wheel.

Figure 1:
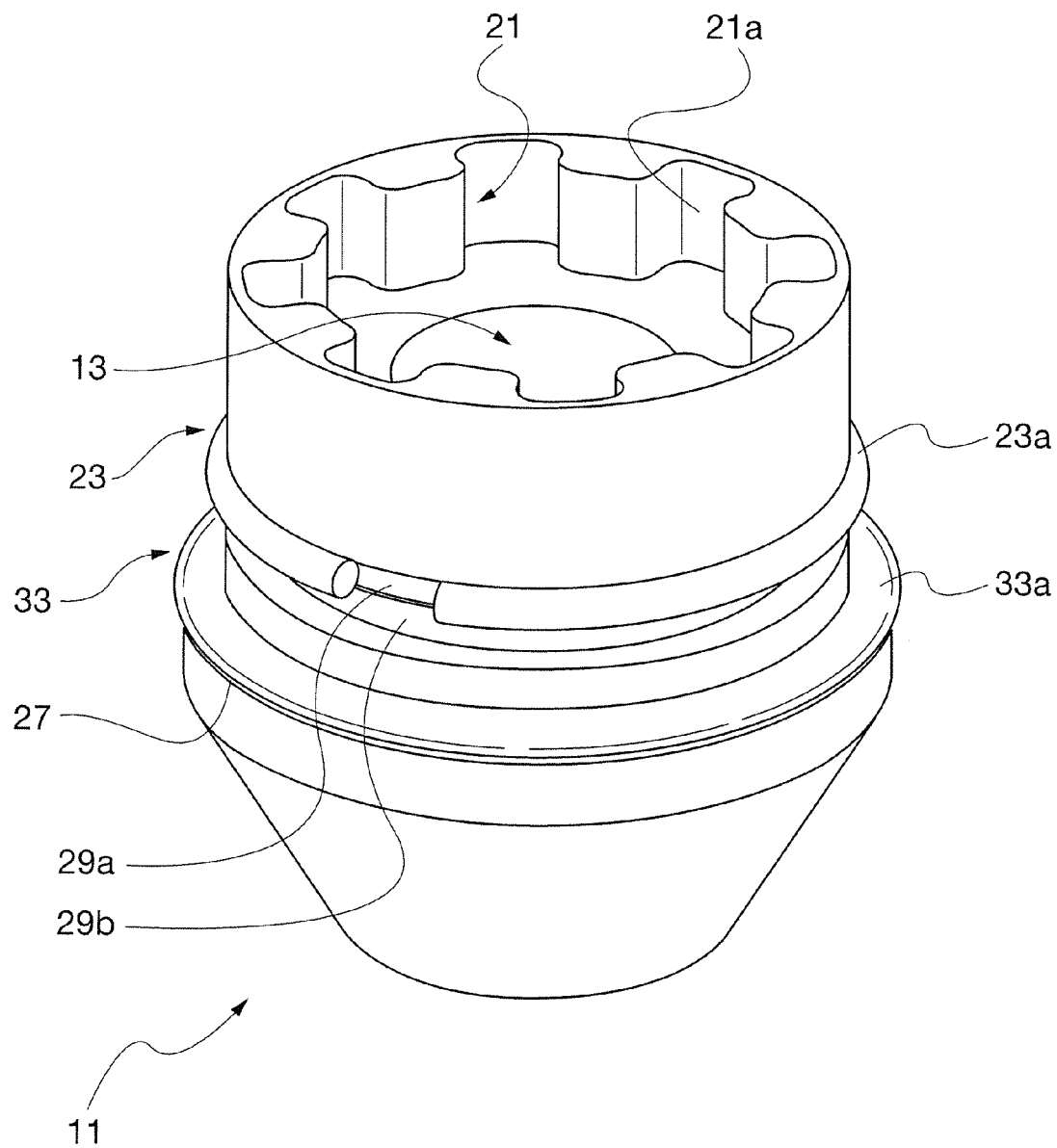
FIG. 1 is a perspective view of the device according to the invention from which the bushing has been removed.
Figure 2A:
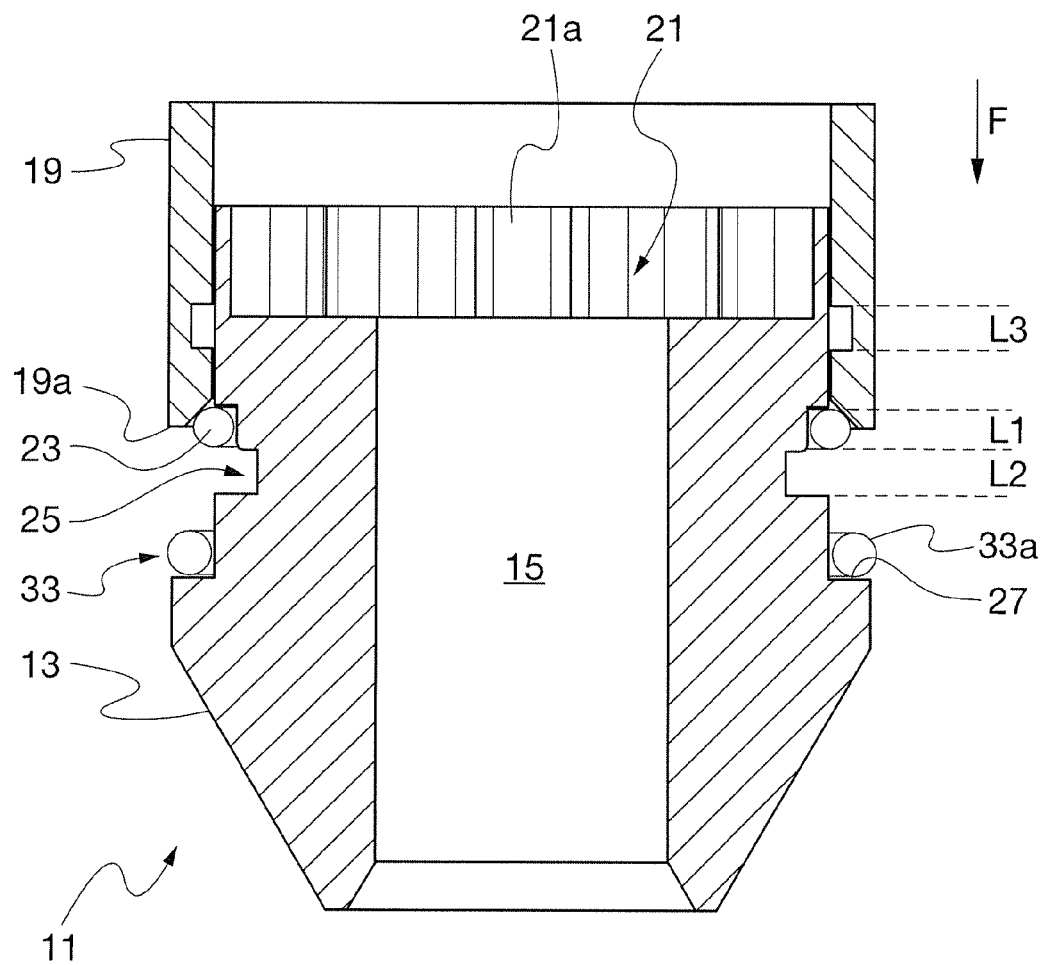
FIGS. 2A to 2E are sectional views along a longitudinal plane of the device of FIG. 1 in the same number of assembly steps.
Figure 2B:
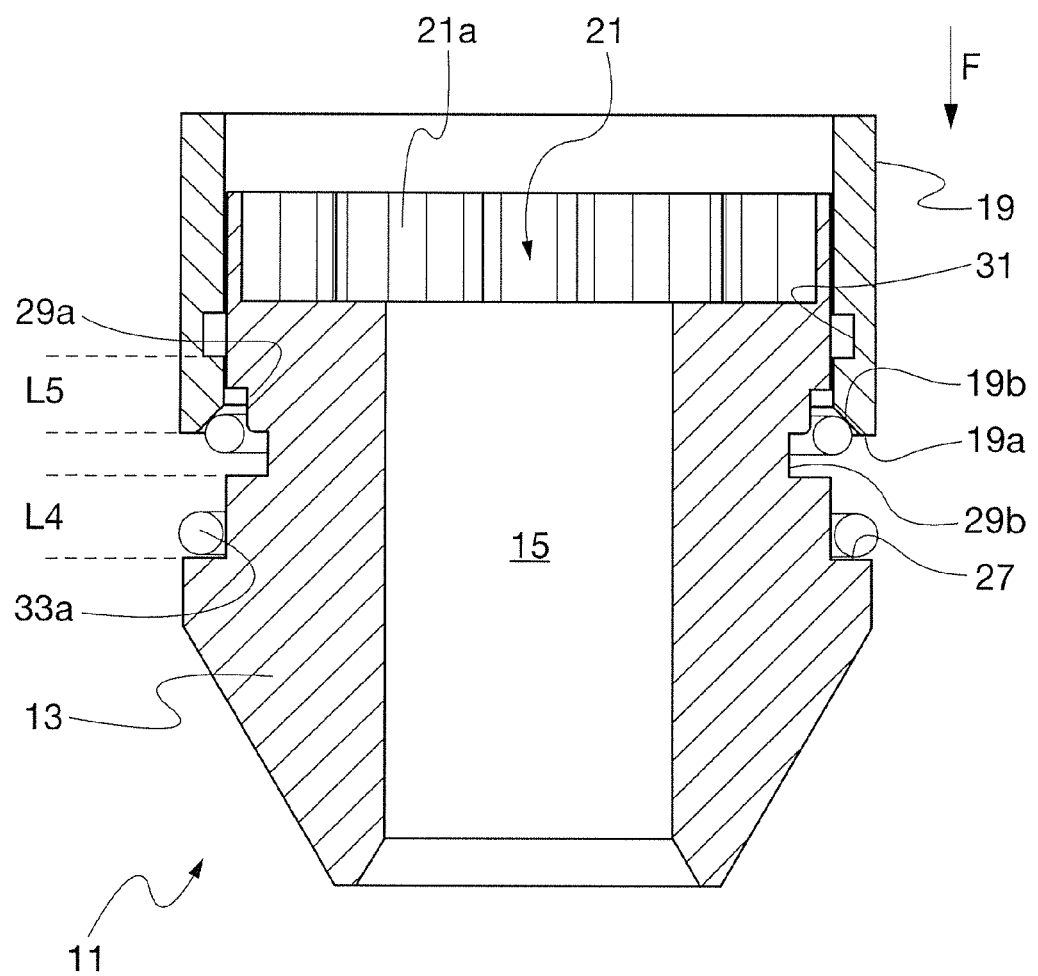
Figure 2C:
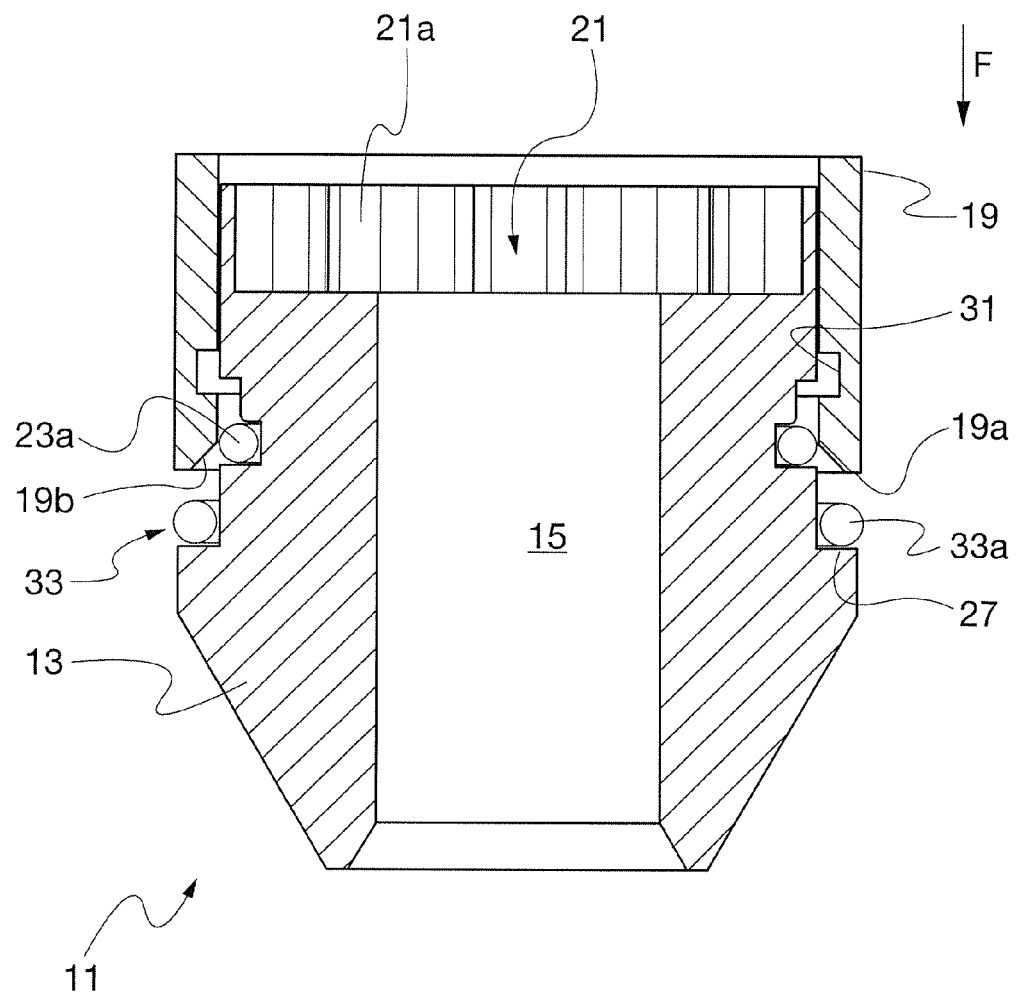
Figure 2D:
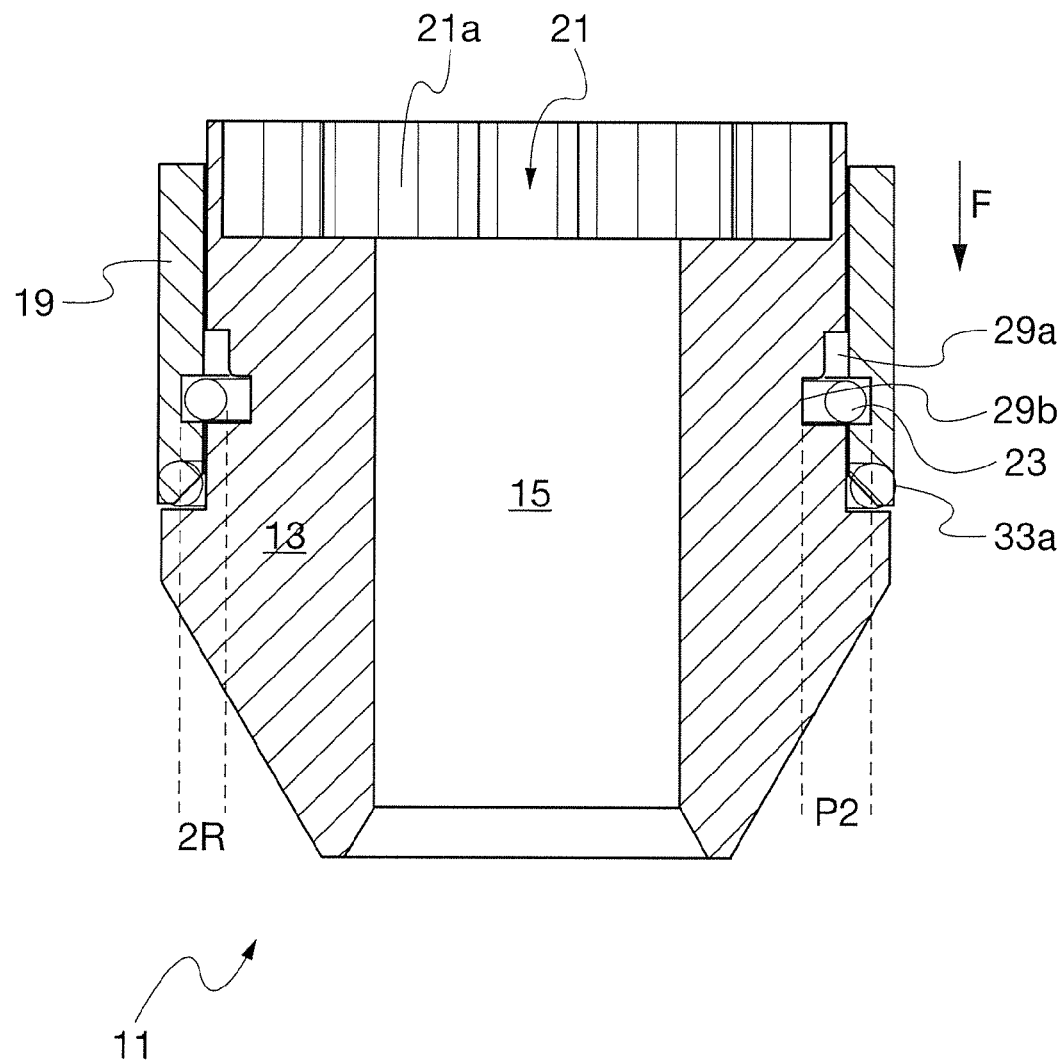
Figure 2E:
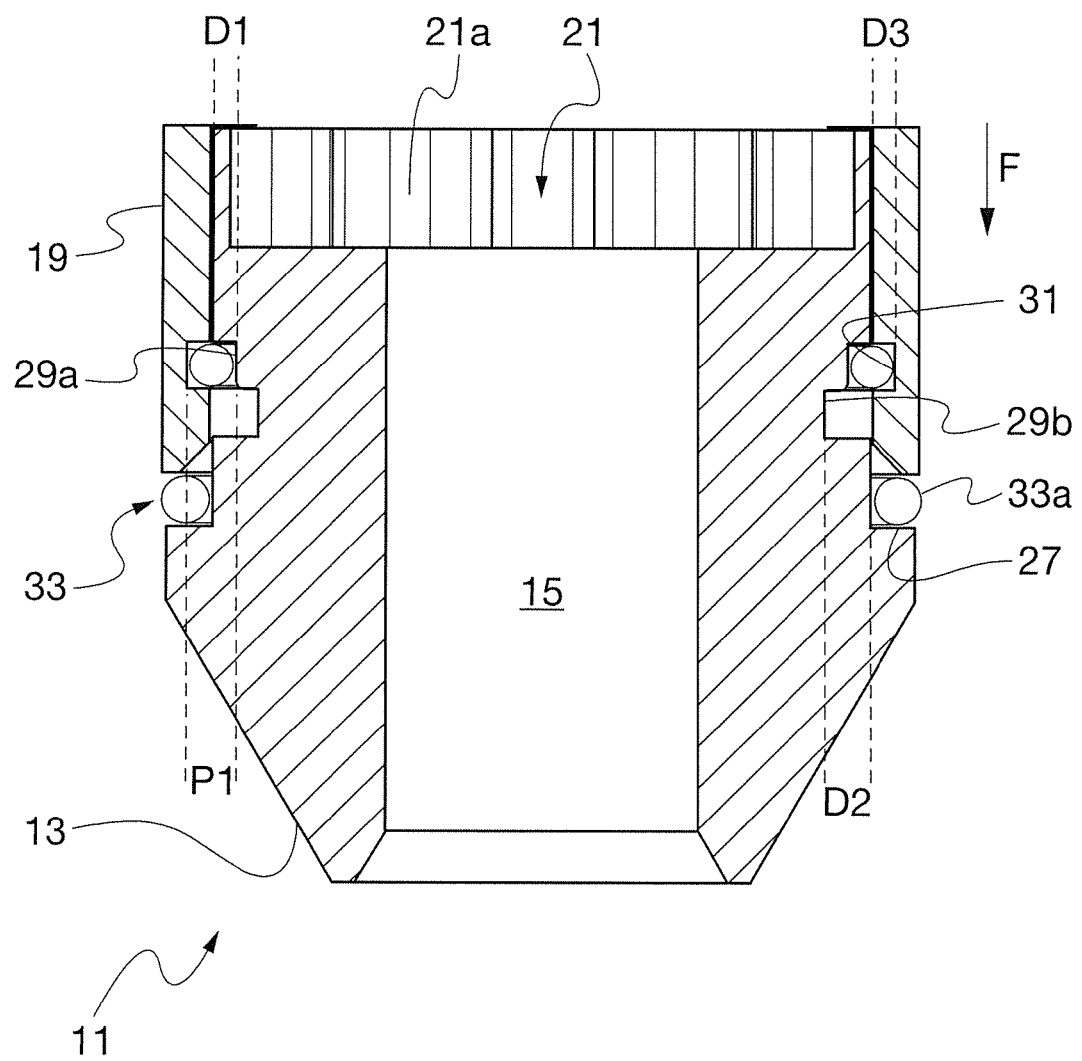
Figure 3:
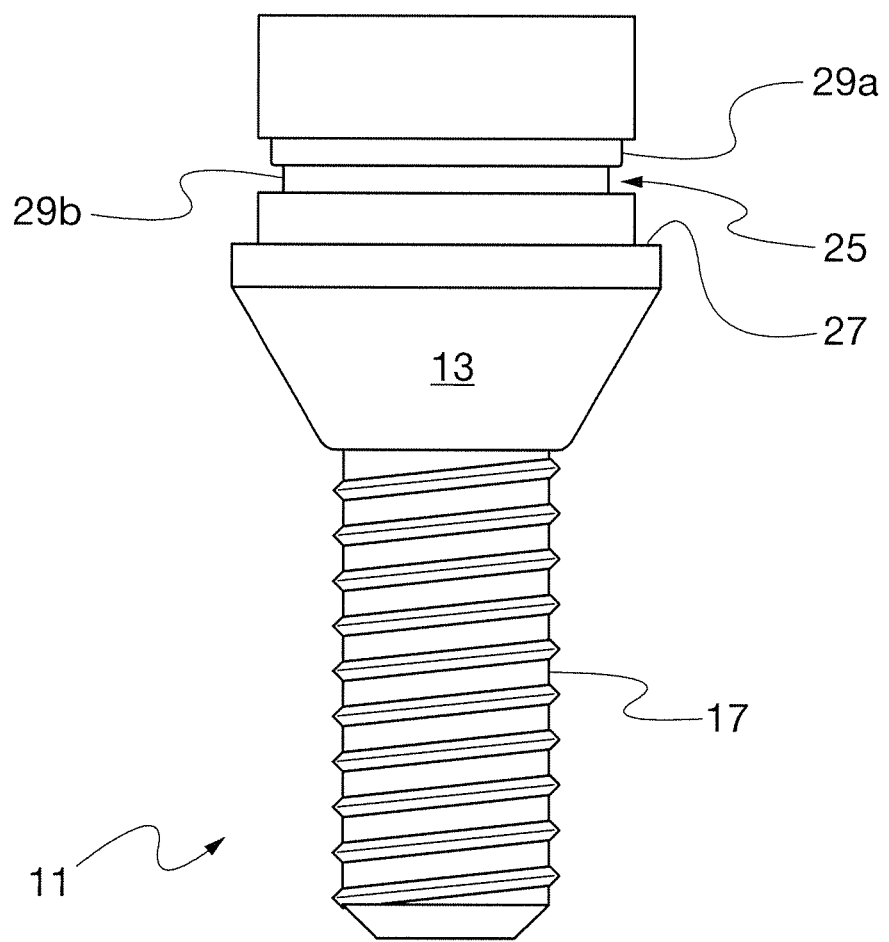
FIG. 3 is a side view of the device made in form of a bolt, from which the bushing has been removed.

For this purpose, the device 11 is provided either with a threaded cavity 15 or with a threaded stem 17, depending on whether it is made in form of a nut (FIGS. 1 and 2A to 2E) or of a bolt (FIG. 3). In the first case the cavity 15 will be preferably obtained in the body 13 and it will be threaded internally, so that the device 11 can be screwed onto one of studs provided in the vehicle hub. In the second case, the body 13 will be stably associated to the threaded stem 17, so that the device 11 can be screwed into one of the threaded holes provided in the vehicle hub. The stem 17 can be obtained as a single body with the body 13, or it can be fastened to the body 13, for example screwed in the cavity 15 previously made.

Around the body 13 an associated neutral bushing 19 is provided, whose purpose is to prevent that the body 13 can be rotated by grasping it from outside with a conventional tool, such as a pincer.

Engagement means 21 for a special key (not shown) are provided on the head of the body 13. As an alternative, said engagement means 21 can be provided onto a radial projection defined at the base of the body 13 of the device, according to the teaching of EP 2196686. In general, said engagement means 21 comprise a groove 21a shaped in different ways, such as in the example shown in the appended figures, or a series of holes arranged in different ways.

According to the invention, the bushing 19 is stably associated around the body 13, so as to be able to freely rotate with respect to it, thanks to the cooperation between a retaining element 23, housed in an appropriate radial seat 25 and an abutment area 27, radially defined around the body 13.

In order to assure the maximum resistance to burglary, the antitheft locking device 11 must meet two main requirements: the first one is that the bushing 19 can freely rotate around the body 13 of the device and the second one is that the bushing 19 is associated to the body 13 of the device, such as that it can not be separated therefrom anymore, unless breakings or permanent deformations of the materials would occur.

According to the invention, these two requirements are met thanks to the fact that when the antitheft device 11 is assembled, the retaining element 23 is housed in a distal portion of said seat with respect to the abutment area 27, is partially obtained in the body 13 of the device 11 and partially in the bushing 19, and has a size that substantially prevents radial movements of the retaining element 23.

Always according to the invention said seat, furthermore, has a depth variable in the axial direction so as to define a proximal portion of said seat with respect to the abutment area 27, in which the retaining element 23 is temporarily housed during the assembly of the bushing 19 on the body 13 and in which said element 23 is housed with a certain radial clearance.

According to a preferred embodiment of the invention, during the assembly of the bushing 19 on the body 13 of the device 11, the axial movement of the bushing 19 in the direction denoted with arrow "F", causes the corresponding shifting of the retaining element 23, firstly from the distal portion to the proximal one and subsequently from the proximal portion to the distal one.

According to the preferred embodiment of the invention represented in the appended figures, the aforesaid requirements are met in the following way.

The outer surface of the body 13 of the antitheft device is provided with a circumferential groove having an axially varying depth, wherein a first portion 29a with depth D1 and a second portion 29b with depth D2>D1 are defined.

Similarly, the bushing 19 is provided with a circumferential groove 31 with depth D3 on its inner surface.

The groove portions 29a, 29b in the body 13 and the groove 31 in the bushing 19, furthermore, have widths L1, L2, L3 respectively, which are substantially the same.

During the axial shifting of the bushing 19 along the body 13, the first groove portion 29a, or distal groove portion with respect to the abutment area 27, defines, together with the groove 31 obtained in the bushing 19, the aforesaid distal portion of the seat 25 for the retaining element 23, while the second groove portion 29b, or proximal groove portion with respect to the abutment area 27, defines, together with said groove 31 in the bushing 19, the corresponding proximal portion of the seat 25.

Altogether, when the groove 31 of the bushing 19 is axially aligned with the distal groove portion 29a in the body 13 of the device, it will be P1=D1+D3 where P1 is the radial depth of the distal portion of the seat 25 defined therein. When, instead, the groove 31 of the bushing 19 is axially aligned with the proximal groove portion 29b in the body of the device 13, it will be P2=D2+D3 where P2 is the depth of the proximal portion of the seat defined therein.

According to the invention, depth P1 is substantially equal to the thickness in the radial direction of the retaining element 23. Moreover, always according to the invention, it will be P2>P1 so that the retaining device can be housed in the proximal portion of the seat 25, with a certain clearance, so as to make the insertion of the bushing 19 possible, as it will evident from the description of the assembly method of the device 11.

If, like in the illustrated example, the retaining element comprises an interrupted ring 23a made of steel wire having a circular section, depth P1 will be substantially equal to diameter 2R of the wire of said ring 23.

In other embodiments the ring 23 can be made, for instance, with a square or rectangular section and, in such case, depth P1 will be in the order of the length of the side of the ring section, which extends in the radial direction.

Always according to the invention, the proximal groove portion 29a in the body 13 of the device 11 is made at a distance L4 from the abutment edge 27.

The groove 31 in the bushing 19, instead, is arranged at a distance L5<L4 from the edge 19a of the bushing, intended for abutting against the abutment edge 27 in the body 13 of the device 11.

In this way, when mounting the bushing 19 on the body 13, the groove 31 provided in the bushing 19 can be aligned with both the distal groove portion 29a and the proximal groove portion 29b.

Advantageously, according to the invention, an elastic element 33 is interposed between the abutment edge 27 and the edge 19a of the bushing 19. Said elastic element 33 can preferably comprise a ring 33a of rubber or of a similar material, whose diameter will be preferably at least in the order of the width L2 of the proximal groove portion 29a. As an alternative, the elastic element 33a can comprise a cup spring or another similar device.

Said elastic element 33 allows to maintain the bushing 19 spaced from the abutment edge 27 and the retaining element 23 housed in the distal groove portion 29a, obtained in the body 13 of the device 11.

The assembly method of the device 11 according to the invention will be described hereinafter.

In a first step of the method the elastic element 33, if present, and the retaining element 23 are inserted around the body 13 of the device 11 in sequence.

The bushing 19 is then fitted on the body 13 of the device 11 until it substantially reaches the configuration of FIG. 2A.

With reference to FIG. 2B, the bushing 19 is caused to axially slide towards the abutment edge 27 in the direction denoted with arrow "F" and, during this sliding, the retaining element 23 is pushed towards the proximal portion 29b of the groove 29.

With reference to FIG. 2C, the retaining element 23 is pushed inside the proximal portion 29b of the groove 31 by the bushing 19 passing therethrough, said bushing preferably having a bevelled inner edge 19b for facilitating this action.

With reference to FIG. 2D, the bushing 19 is caused to further advance towards the abutment edge 27, until the groove 31 in the bushing 19 is aligned with the proximal groove portion 29b. Once this configuration has been reached, the retaining element 23 is housed in the proximal portion of the seat 25 defined by the cooperation of the proximal groove portion 29b with the groove 31 obtained in the bushing 19.

Moreover, said ring 23a will be preferably elastic, for instance made of spring-steel, and it will have a diameter larger than the inner diameter of the proximal portion of the seat 25 so that it slightly expands outwards, i.e. towards the groove 31 in the bushing 19, as shown in FIG. 2D.

If, like in the shown example, the elastic element 33 interposed between the abutment edge 27 and the edge 19a of the bushing 19 is present, the arrangement of FIG. 2D consequently causes the radial compression of this elastic element 33. When the force that caused the sliding of the bushing 19 towards the abutment edge 27 in the direction denote with arrow "F" fails, the elastic element 33, if present, causes the return of the bushing 19 i.e. the removal of the bushing 19 from the abutment edge 27, until it reaches the configuration shown in FIG. 2E.

In the configuration of FIG. 2E, the bushing 19 can not be axially withdrawn anymore due to the presence of the retaining element 23. Thanks to the fact that the retaining element 23 is housed in the proximal portion of the seat 25, substantially without clearances in the radial direction, a possible force applied at the edge 19a, for example by means of a lever or a screwdriver, for trying to axially separate the bushing 19 from the body 13 removing it further from the abutment edge 27 will not have substantially effect.

It is to be noticed that the presence of the elastic element 33 is not essential. The main purpose of the elastic element 33 is, in fact, to prevent axial clearances of the bushing 19, once the assembly is completed. However, even in presence of such clearances, the fastening system of the bushing 19 would be equally effective.

Though the invention has been described with reference to a single retaining element, it is also possible to provide a plurality of said elements and consequently of seats circumferentially arranged.

Moreover, it is to be noticed that according to the invention it is also possible to realise the groove with variable depth in the bushing rather than in the body of the device. In such case, however, the distal groove portion will have a depth greater than the proximal portion.

The invention claimed is:

1. An antitheft locking device (11), for fixing a wheel to a motor vehicle hub, made in form of a nut or bolt, comprising a body (13) provided with engagement means (21) for a complementary key by means of which it is possible to rotate said device, and an associated bushing (19) freely rotatable around said body (13), in which at least a radial seat (25) is provided for at least a retaining element (23) capable of preventing the axial withdrawal of the bushing (19) from the body (13), said seat being obtained partially in the body (13) of the device and partially in the bushing (19), wherein that said seat (25) has a depth varying along the axial direction,
    wherein when the antitheft device (11) is assembled, the retaining element (23) is housed in a distal portion of said seat (25) with respect to an abutment area (27) for the bushing, said distal portion being radially defined around the body (13), partially in the body (13) of the device (11) and partially in the bushing (19), whose size is such as to substantially prevent any radial movements of the retaining element (23),
    wherein said seat defines a proximal portion of said seat with respect to the abutment area (27) inside which the retaining element (23) is temporarily housed during the assembly of the bushing (19) on the body (13), and
    wherein said element (23) is housed with a certain radial clearance.

2. A device according to claim 1, wherein the outer surface of the body (13) of the antitheft device (11) is provided with a circumferential groove having an axially varying depth, wherein a first portion (29a) with depth D1 and a second portion (29b) with depth D2>D1 are defined.

3. A device according to claim 2, wherein the bushing (19) is provided, on its inner surface, with a circumferential groove (31) with depth D3.

4. A device according to claim 3, wherein the groove portions (29a, 29b) in the body (13) and the groove (31) in the bushing (19) have substantially the same width.

5. A device according to claim 3, wherein during the axial sliding of the bushing (19) along the body (13), the first groove portion (29a), or distal portion of the groove with respect to the abutment area (27), defines, together with the groove (31) obtained in the bushing (19), the aforesaid distal portion of the seat (25) for the retaining element (23), while the second groove portion (29b), or proximal groove portion with respect to the abutment area (27), defines, together with said groove (31) in the bushing (19), the corresponding proximal portion of the seat (25) for the retaining element (23).

6. A device according to claim 5, wherein the radial depth P1 of the distal portion of the seat (25) is lower than the radial depth P2 of the proximal portion of the seat (25) and wherein the radial depth P1 of the distal portion of the seat (25) is substantially equal to the thickness of the retaining element (23) along the radial direction.

7. A device according to claim 6, wherein the retaining element (23) comprises an interrupted ring (23a) made of steel wire with circular section, and wherein the radial depth P1 of the distal portion of the seat (25) is substantially equal to the diameter 2R of the wire of said ring (23).

8. A device according to claim 7, wherein the proximal portion (29*a*) of the groove in the body (13) of the device (11) is arranged at a distance L4 from the abutment edge (27) and the groove (31) in the bushing (19) is arranged at a distance L5<L4 from the edge (19*a*) of the bushing intended for abutting against the abutment edge (27) in the body (13) of the device (11) and wherein between the abutment edge (27) of the body (13) and the edge (19*a*) of the bushing (19) an elastic element (33) is interposed.

\* \* \* \* \*